(12) United States Patent
Guisasola

(10) Patent No.: US 11,473,485 B2
(45) Date of Patent: Oct. 18, 2022

(54) COOLING OF THE SPARK PLUG WITH IMPROVED CONTACT SURFACE

(71) Applicant: Caterpillar Energy Solutions GmbH, Mannheim (DE)

(72) Inventor: Inigo Guisasola, Mannheim (DE)

(73) Assignee: Caterpillar Energy Solutions GmbH, Lunen (DE)

( * ) Notice: Subject to any disclaimer, the term of this patent is extended or adjusted under 35 U.S.C. 154(b) by 0 days.

(21) Appl. No.: 17/415,965

(22) PCT Filed: Dec. 19, 2019

(86) PCT No.: PCT/EP2019/025463
§ 371 (c)(1),
(2) Date: Jun. 18, 2021

(87) PCT Pub. No.: WO2020/126087
PCT Pub. Date: Jun. 25, 2020

(65) Prior Publication Data
US 2022/0065156 A1 Mar. 3, 2022

(30) Foreign Application Priority Data
Dec. 20, 2018 (GB) ..................... 1820827

(51) Int. Cl.
*F01P 3/16* (2006.01)
*F02M 53/04* (2006.01)
(Continued)

(52) U.S. Cl.
CPC ............. *F01P 3/16* (2013.01); *F02M 53/043* (2013.01); *F02M 57/06* (2013.01); *F02P 13/00* (2013.01);
(Continued)

(58) Field of Classification Search
CPC ......... F01P 3/16; F02M 53/043; F02M 57/06; F02P 13/00; H01T 13/06; H01T 13/08; H01T 13/16; H01T 13/54
(Continued)

(56) References Cited

U.S. PATENT DOCUMENTS 2,096,199 A * 10/1937 Rabezzana ............. H01T 13/16
439/126
2,270,765 A * 1/1942 Nowosielski ......... H01T 13/467
313/11.5
(Continued)

FOREIGN PATENT DOCUMENTS

DE 3109896 A1 9/1982
GB 2541880 A 3/2017
(Continued)

OTHER PUBLICATIONS

International Search Report related to PCT Application No. PCT/EP2019/025463 dated Mar. 23, 2020.
(Continued)

*Primary Examiner* — Mahmoud Gimie

(57) ABSTRACT

The present invention pertains to a spark plug for an internal combustion engine, comprising a metal outer shell extending in a longitudinal direction from a proximal end to a distal tip end configured to be oriented towards a combustion chamber, said outer shell comprising a fixation portion for attachment of the spark plug to a metal sleeve of the internal combustion engine and arranged at a region proximal of the tip end, wherein the outer shell furthermore comprises a first contact surface arranged at a region distal of the fixation portion and configured to contact a distal end of the sleeve, when the spark plug is attached to the sleeve.

15 Claims, 3 Drawing Sheets

(51) Int. Cl.
  *F02M 57/06* (2006.01)
  *H01T 13/06* (2006.01)
  *F02P 13/00* (2006.01)
  *H01T 13/08* (2006.01)
  *H01T 13/16* (2006.01)
  *H01T 13/54* (2006.01)

(52) U.S. Cl.
  CPC .............. *H01T 13/06* (2013.01); *H01T 13/08* (2013.01); *H01T 13/16* (2013.01); *H01T 13/54* (2013.01)

(58) Field of Classification Search
  USPC ...................................................... 123/41.31
  See application file for complete search history.

(56) References Cited

U.S. PATENT DOCUMENTS

| | | | |
|---|---|---|---|
| 2,361,975 A | | 11/1944 | Sobel |
| 2,646,782 A | * | 7/1953 | Fisher .................... H01T 13/08 313/143 |
| 2,927,144 A | * | 3/1960 | Bychinsky .............. H01T 13/08 123/169 R |
| 3,155,085 A | | 11/1964 | Jones et al. |
| 3,316,437 A | * | 4/1967 | Weins .................... F23R 3/283 313/120 |
| 3,529,837 A | * | 9/1970 | Eaton ...................... H01T 13/08 277/944 |
| 4,006,725 A | * | 2/1977 | Baczek .................. F02M 57/06 123/267 |
| 5,697,334 A | | 12/1997 | Below |
| 5,839,403 A | | 11/1998 | Grant et al. |
| 5,918,571 A | | 7/1999 | Below |
| 5,992,364 A | | 11/1999 | Bubeck et al. |
| 7,477,006 B2 | | 1/2009 | Fukuzawa et al. |
| 8,237,343 B2 | | 8/2012 | Hotta et al. |
| 9,912,126 B2 | | 3/2018 | Fujimura et al. |
| 9,979,162 B2 | | 5/2018 | Kasahara et al. |
| 2009/0102346 A1 | * | 4/2009 | Fukuzawa ............... H01T 13/08 313/135 |
| 2018/0123324 A1 | | 5/2018 | Niessner et al. |

FOREIGN PATENT DOCUMENTS

| | | |
|---|---|---|
| JP | 2018184839 | 11/2018 |
| WO | 2015090723 A1 | 6/2015 |
| WO | 2018198951 A1 | 11/2018 |

OTHER PUBLICATIONS

GB Search Report related to Application No. 1820827.2; dated Jun. 17, 2019.

* cited by examiner

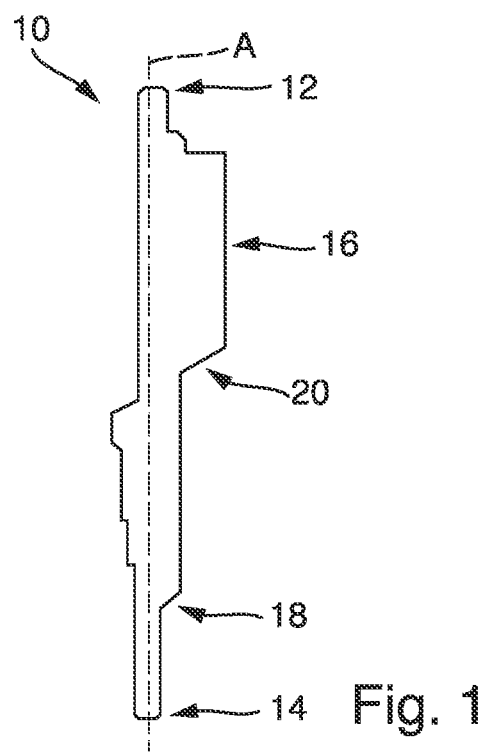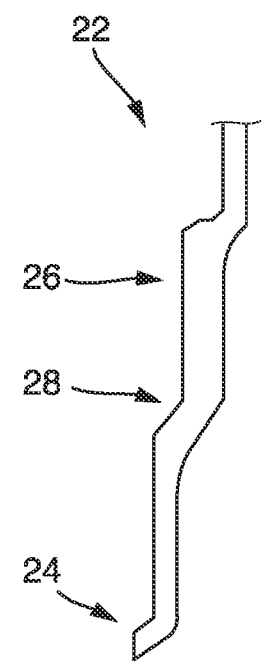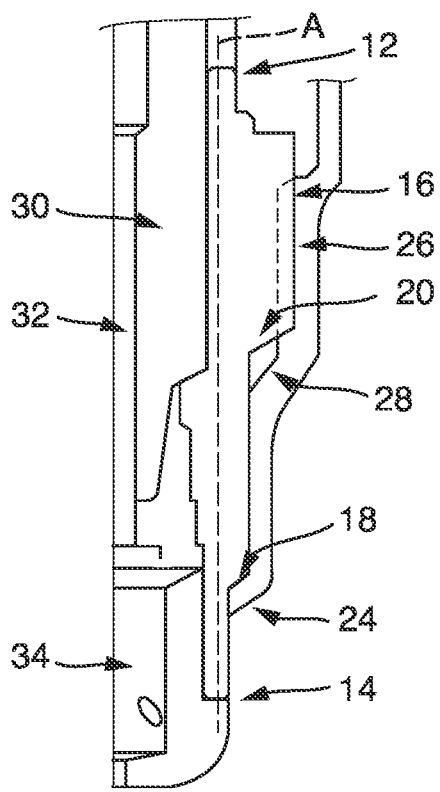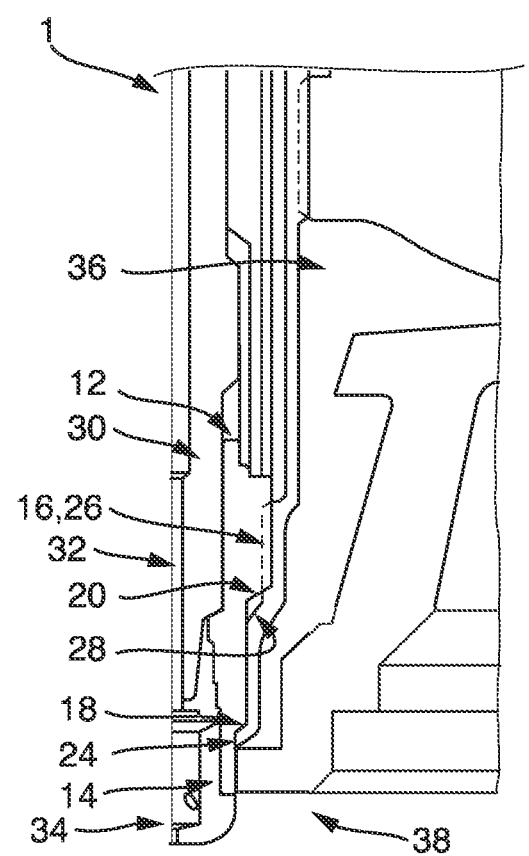

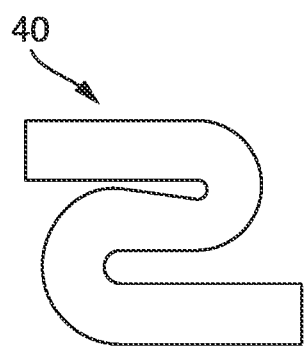
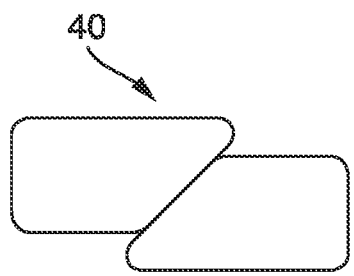
Fig. 5A    Fig. 5B
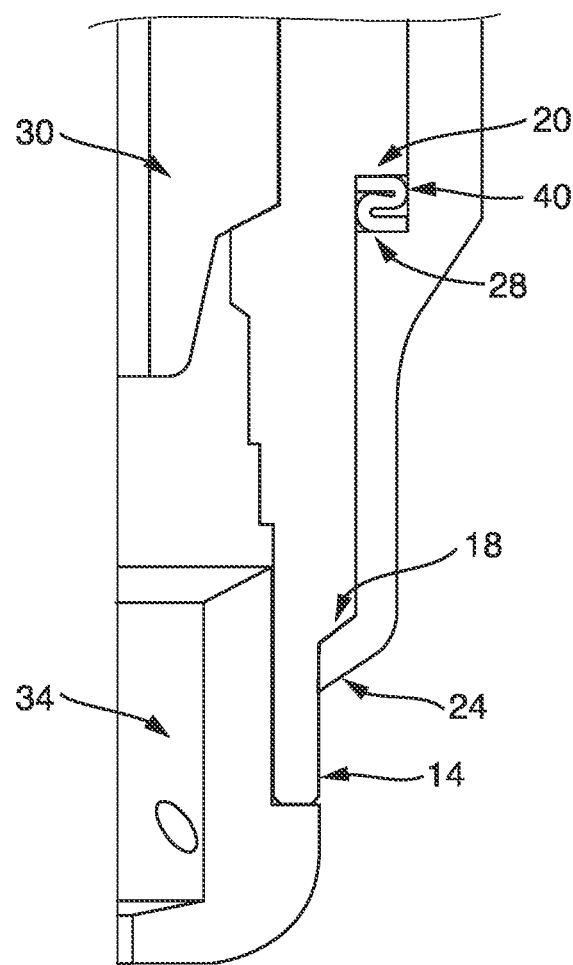
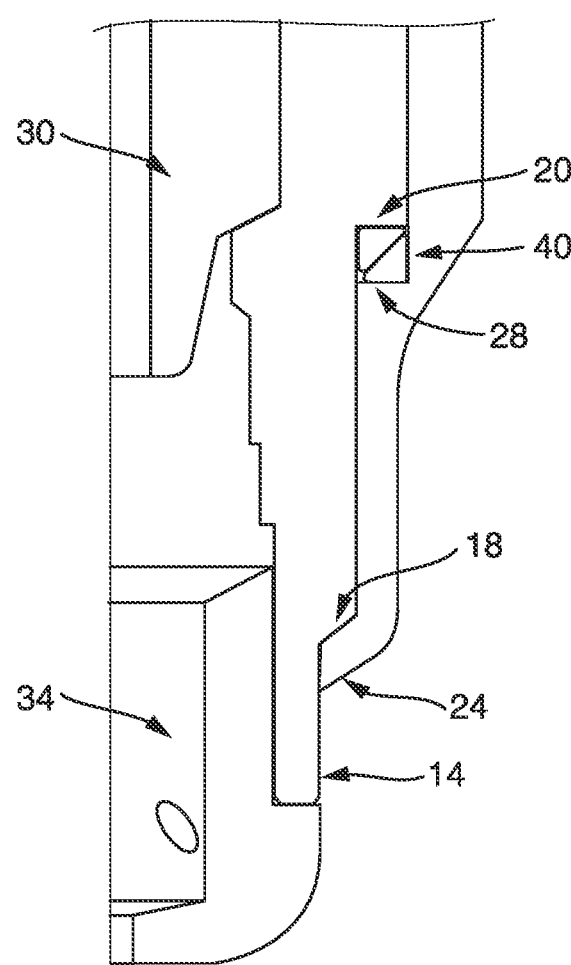
Fig. 6A    Fig. 6B

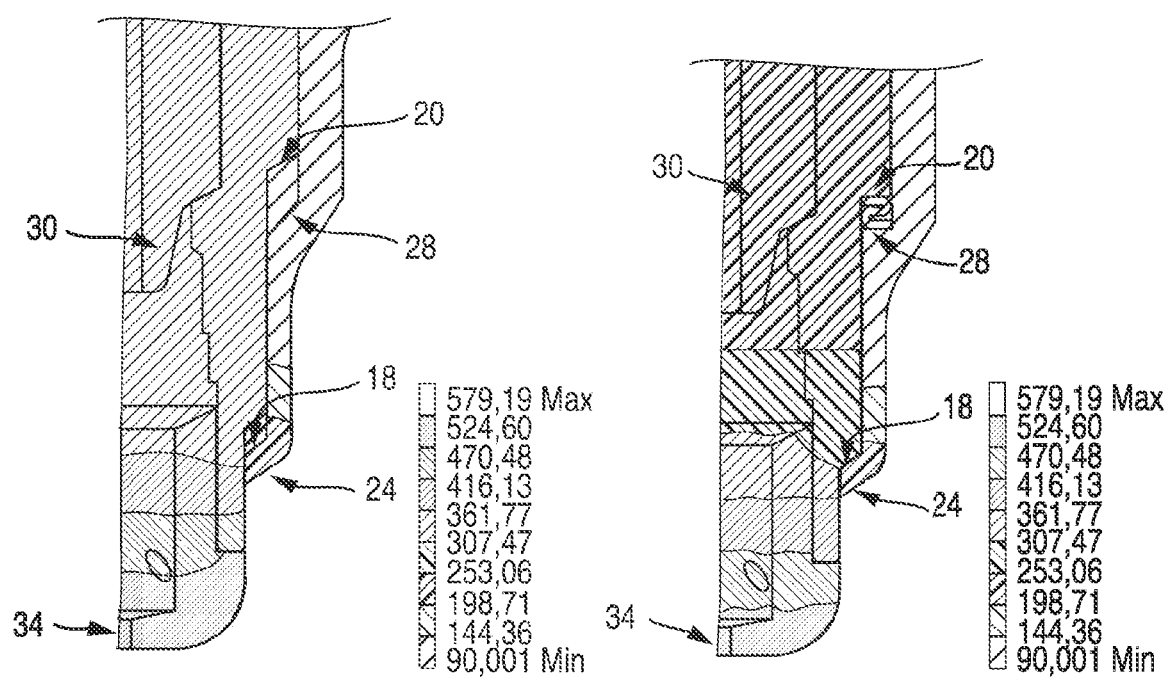
Fig. 7A
Fig. 7B
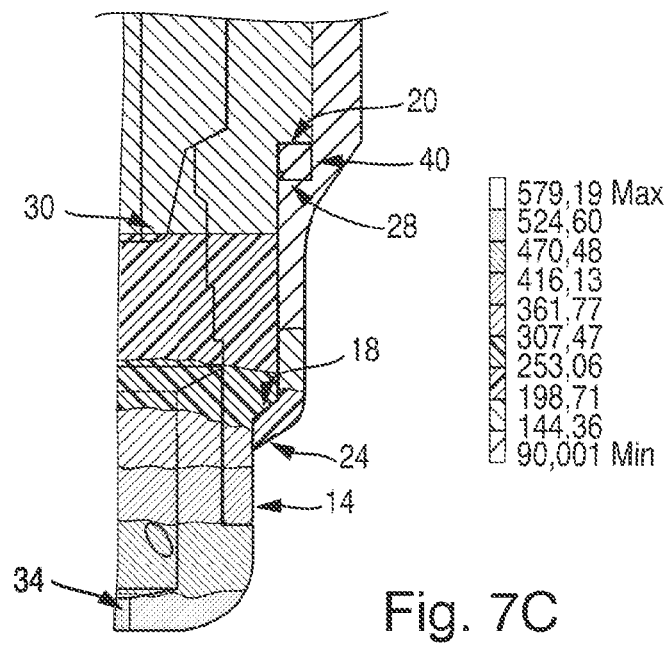
Fig. 7C

COOLING OF THE SPARK PLUG WITH IMPROVED CONTACT SURFACE

This patent application is a 35 USC § 371 U.S. national stage of International Application No. PCT/EP2019/025463 filed on Dec. 19, 2019, which claims the benefit and priority of Great Britain Application No. 1820827.2 filed on Dec. 20, 2018, the disclosures of which are incorporated in their entirety by reference herein.

TECHNICAL FIELD

The present invention relates to a spark plug for an internal combustion engine and having an outer shell with an improved cooling function as well as a metal sleeve to receive an outer shell of such spark plug.

TECHNOLOGICAL BACKGROUND

In engines the cooling of the spark plug and the sealing for the combustion room and coolant retaining cavities or conduits is often challenging, in particular for engines with a high specific performance. In particular, higher temperatures for both the tip end of the spark plug extending into the combustion room and the electrically insulating parts, e.g. a ceramic layer, are often detrimental and may increase wear, eventually leading to a dysfunction and failure of the respective parts. Such wear may furthermore lead to a displacement of the spark plug, which may affect the performance of the engine, e.g. by causing a pre-ignition within the combustion room.

Accordingly, it may be advantageous to increase the heat conducting surface area, such that thermal loads may dissipate and may be distributed, thereby reducing the temperature. However, changing the position of the primary heat conducting surface may result in a worsening of the thermal load in particular regions. Furthermore, due to the generally fixed conditions and the stiffness of various components of the spark plug and the combustion engine, e.g. of a receiving sleeve of the combustion engine, it is difficult to ensure that a heat conducting surface of the spark plug is actually in contact with a corresponding surface to conduct heat, in particular in view of the high stiffness compared with the low tolerances. By the same token, the provision of more than one conducting surface is generally not feasible due to said low tolerances.

SUMMARY OF THE INVENTION

Starting from the prior art, it is an objective to provide a new and inventive spark plug. In particular, it may be an objective to provide a spark plug with an improved cooling to reduce the high temperatures provided by the operational conditions of a combustion engine.

This objective is solved by means of a spark plug with the features of claim 1 and a sleeve with the features of claim 12. Preferred embodiments are set forth in the present specification, the figures as well as the dependent claims.

Accordingly, a spark plug for an internal combustion engine is suggested, comprising a metal outer shell extending in a longitudinal direction from a proximal end to a distal tip end configured to be oriented towards a combustion chamber, wherein the outer shell comprises a fixation portion for attachment of the spark plug to a metal sleeve of the internal combustion engine and being arranged at a region proximal of the tip end, wherein the outer shell furthermore comprises a first contact surface arranged at a region distal of the fixation portion and configured to contact a distal end of the sleeve, when the spark plug is attached to the sleeve.

Furthermore, a sleeve for an internal combustion engine is suggested, wherein said sleeve is configured to receive a metal outer shell of a spark plug for an internal combustion engine comprising a distal tip end configured to be oriented towards a combustion chamber, said sleeve comprising a fixation portion, preferably a threaded portion, configured to engage a corresponding fixation portion of the outer shell, said sleeve furthermore comprising a distal end configured to contact a first contact surface of the outer shell arranged at a region distal of the fixation portion, when the spark plug is attached to the sleeve.

BRIEF DESCRIPTION OF THE DRAWINGS

The present disclosure will be more readily appreciated by reference to the following detailed description when being considered in connection with the accompanying drawings in which:

FIG. 1 shows a schematic partial side view of an outer shell of a spark plug having a first and second contact surface;

FIG. 2 shows a schematic partial side view of a sleeve for receiving an outer shell of a spark plug;

FIG. 3 shows a schematic partial side view of an outer shell of a spark plug attached to a sleeve of a combustion engine;

FIG. 4 shows a schematic partial side view of a spark plug accommodated in a combustion engine;

FIGS. 5A and 5B show exemplary embodiments of a flexible heat conducting member in a respective schematic side view;

FIGS. 6A and 6B show exemplary embodiments of the flexible heat conducting members according to FIGS. 5A and 5B accommodated between the outer shell of a spark plug and a sleeve of the combustion engine; and FIGS. 7A, 7B, and 7C show heat maps according to different arrangements of the outer shell of the spark plug and the sleeve of the combustion engine.

DETAILED DESCRIPTION OF PREFERRED EMBODIMENTS

In the following, the invention will be explained in more detail with reference to the accompanying figures. In the figures, like elements are denoted by identical reference numerals and repeated description thereof may be omitted in order to avoid redundancies.

In FIG. 1 an outer shell 10 of a spark plug for a combustion engine is shown. Although not depicted in further detail, the outer shell 10 may hence be configured to enclose various components of the spark plug, e.g. an insulating portion and a center electrode. For example, the outer shell 10 may be formed as an essentially cylindrical body providing an outer circumference of the spark plug, wherein the outer circumference may be continuous or discontinuous.

The outer shell 10 is depicted as an essentially longitudinal body from a proximal end 12 to a distal tip end 14. Accordingly, the proximal end 12 may be oriented to an outside part of the combustion engine that is configured to receive a terminal end for providing an electrical connection to the spark plug.

By the same token, the distal tip end 14 is configured to be oriented towards a combustion chamber of the combustion engine and hence may be in contact with a combustive mixture. More particularly, the distal tip end 14 of the outer shell 10 may be configured to comprise an electrode to provide an ignition of said combustive mixture. The proximal end 12 and the distal tip end 14 together define a longitudinal direction A, as indicated by the dashed line.

At a proximal region of the outer shell 10 a fixation portion 16 is provided, which is configured to attach the outer shell 10 of the spark plug to a sleeve (not shown) provided in the combustion engine. Accordingly, the fixation portion 16 ensures that the outer shell 10, and hence the spark plug, is securely fixed to the combustion engine, such that a consistent operational performance may be provided. Although a variety of fixation portions may be envisaged, the embodiment according to FIG. 1 comprises an outer thread for attaching the outer shell 10 to a corresponding thread of the sleeve. Accordingly, the threaded portion may be configured to releasably attach the outer shell 10 to a sleeve of the combustion engine, such that the spark plug as a whole may be removed from the combustion engine, e.g., for replacement purposes.

At a portion of the outer shell 10 distal to the fixation portion 16, the outer shell 10 furthermore comprises a first contact surface 18. The first contact surface 18 is depicted to be in proximity of the distal tip end 14 of the outer shell 10. However, the first contact surface 18 may also be in closer proximity to the distal tip end 14 or at the distal tip end 14, or may be arranged closer to the fixation portion 16. In either case, the first contact surface 18 is arranged to contact a distal end of a sleeve of the combustion engine, such that a heat conducting surface or interface is established between the outer shell 10 and a sleeve.

Furthermore, the first contact surface 18 is depicted comprising a shoulder, which provides a chamfer or bevel structure upon inserting the outer shell 10 into a sleeve, such that the first contact surface 18 may engage with or is biased by the distal end of the sleeve. However, the shoulder or chamfer is optional and may also be replaced by alternative structures, depending on the requirements of the outer shell 10 in regard to the sleeve. In addition, although not explicitly shown, the distal tip end 14 of the outer shell 10 may also comprise a chamfer to facilitate the insertion of the outer shell 10 into a sleeve and/or to provide a positive fitting of the outer shell 10.

By providing the first contact surface 18 at a distal region of the outer shell 10 heat may dissipate into the sleeve, such that an improved heat conductance is provided for the distal tip end 14. Thus, the temperature of the distal tip end 14 may be reduced during operation of the combustion engine.

In addition to the first contact surface 18 the embodiment according to FIG. 1 comprises an optional second contact surface 20 that is arranged adjacent to the fixation portion 16, for example, adjacent to the threaded portion of the outer shell 10. The second contact surface 20 may engage a region of the sleeve located proximal to the distal end of the sleeve. Accordingly, a second heat conducting surface may be provided for a portion of the spark plug arranged at a further distance of the distal tip end 14 than the first contact surface 18, as will be described in further detail below.

In FIG. 2 an exemplary embodiment of a sleeve 22 is shown, which may be integrated into the combustion engine, e.g. via a threaded portion at a proximal end (not shown). The sleeve 22 is preferably made of a metal, such that the sleeve 22 provides a thermally conducting surface for a spark plug or outer shell thereof (not shown) attached to the sleeve.

Accordingly, the sleeve 22 comprises a distal end 24, which is configured to engage a first contact surface of a spark plug that is arranged proximate to a distal tip end thereof. The distal end 24 hence provides a thermally conducting surface for a distal part of a spark plug, when a spark plug is attached to the sleeve 22. In the embodiment according to FIG. 2 the distal end 24 furthermore comprises a shoulder, which may engage and/or guide the first contact surface of the outer shell of the spark plug. Hence, the distal end 24 of the sleeve 22 may provide a press fit for the first contact surface of the outer shell, such that it is ensured that an interface between the first contact surface of the outer shell and the distal end 24 of the sleeve 22 has been established, when the spark plug is attached to the sleeve 22.

The attachment of the spark plug to the sleeve 22 is provided by means of a fixation portion 26, here configured as a threaded portion. Accordingly, a corresponding fixation portion or threaded portion of the outer shell of the spark plug may be screwed into the fixation portion 26 of the sleeve 22. The fixation portion 26 is arranged at a location proximate to the distal end 24 of the sleeve 22.

As indicated in the embodiment of FIG. 2, the sleeve 22 is only depicted as a partial view of the sleeve 22, such that a top part of the sleeve 22 is not shown. However, a corresponding fixation portion or threaded portion may be provided at a top part of the sleeve 22 to fix the sleeve 22 to a portion of a combustion engine.

The sleeve 22 furthermore comprises an optional region 28, which is arranged proximal to the distal end 24 and adjacent to the fixation portion 26. The region 28 is configured to engage a corresponding optional second contact surface of the outer shell of the spark plug, such that a second heat conducting interface may be provided at a portion proximal of the distal end 24.

A corresponding arrangement of an outer shell according to FIG. 1 attached to a sleeve according to FIG. 2 is depicted in FIG. 3. The outer shell is again depicted in a longitudinal direction A from a proximal end 12 to a distal tip end 14, as indicated by the dashed line. The longitudinal direction A from the outer shell hence corresponds to a longitudinal direction of the sleeve and furthermore corresponds to a longitudinal direction of the spark plug as a whole.

At occipital proximal region, the outer shell is attached to the sleeve by means of a fixation portion 16 configured as a threaded portion and a corresponding fixation portion 26. Due to the high stiffness of the outer shell and the sleeve and the corresponding low tolerances, the screwing movement of the outer shell into the sleeve may be limited, such that a positioning of the outer shell in a longitudinal direction a with regard to the sleeve may also be limited. However, due to the configuration of the first contact surface 18 of the outer shell and the distal end 24 of the sleeve a press-fit engagement is provided, such that an interface is established providing a heat conducting surface. Hence, heat absorbed by the outer shell, e.g. at the distal tip end 14, may dissipate into the sleeve at said distal end 24. The temperature of the distal tip end 14, which rises due to the exposure to the combustive mixture in the combustion chamber (not shown), may hence be reduced.

By the same token, this may also provide a temperature reduction of a pre-chamber body 34, which may be accommodated at the distal tip end 14. The optional pre-chamber body 34 may comprise one or more holes or openings that facilitate the mixture of air with fuel injected into the combustion chamber, e.g. by a corresponding nozzle configuration.

The arrangement of the first contact surface 18 and the distal end 24 may however cause an increase of temperature of an insulating portion 30 and/or a center electrode 32, both comprised within the outer shell of the spark plug, since heat may be required to dissipate or travel over a longer distance. Accordingly, the second contact surface 20 of the outer shell and the region 28 of the sleeve may be brought into engagement, such that a further heat conducting interface is provided at a more proximal region, thereby providing a further cooling of the portion of the spark plug arranged at a further distance from the distal tip end 14, as will be described in further detail below.

A further improved cooling of the spark plug may be provided by a corresponding configuration of the sleeve forming a barrier for a cavity 36 of the combustion engine comprising a coolant, as shown in the embodiment according to FIG. 4, which generally corresponds to the embodiment according to FIG. 3. Hence, the configuration of both the distal tip end 14 and the first contact surface 18 of the outer shell, the distal end 24 of the sleeve, and the cavity 36 provides a significantly improved cooling of the distal tip end 14. Accordingly, heat that is absorbed from the combustion chamber 38 by e.g. the pre-chamber body 34 and the distal tip end 14 of the outer shell may dissipate into the sleeve from the first contact surface 18 into the distal end 24 of the sleeve and may furthermore dissipate into the coolant, e.g. water, accommodated in the cavity 36.

In order to provide a heat conducting surface or interface between the second contact surface 20 of the outer shell and the region 28 of the sleeve, a flexible heat conducting member 40 may be provided, as depicted by the alternative embodiments according to FIGS. 5A and 5B.

The flexible heat conducting member 40 according to FIG. 5A is formed as an essentially S-formed or sigmoidal shape comprising two curvatures and three longitudinal components comprise between said curvatures and extending therefrom. The sigmoidal flexible heat conducting member 40 hence is formed as a bellows, which provides a spring force in an extending direction, such that the flexible heat conducting member 40 contacts the second contact surface of the outer shell and the region of the sleeve, as depicted in FIG. 6A.

Although the embodiment of the flexible heat conducting member 40 according to FIGS. 5A and 6A comprises two curvatures, any number of curvatures and corresponding longitudinal components may be provided, depending on the requirements of the heat conducting surface or interface, the available space between the second contact surface 20 and the region 28, and the stiffness and tolerances provided by the materials.

The flexible heat conducting member 40 may furthermore be attached to the outer shell by means of e.g. a ring shape enclosing the circumference of the outer shell. Alternatively, the flexible heat conducting member 40 may also be provided at the region 28, such that a replacement spark plug may be provided without a flexible heat conducting member 40.

Accordingly, FIG. 6A shows a zoomed-in embodiment of an outer shell attached to the sleeve, wherein, in addition to the first contact surface 18 at the distal tip end 14 and the distal end 24, a second contact surface 20 is arranged proximal to the first contact surface 18. The second contact surface 20 is configured as a step and is sized and dimensioned to accommodate the flexible heat conducting member 40 according to FIG. 5A. By the same token, the sleeve comprises a region 28 that is configured as a corresponding or matching step to accommodate an opposing end of the flexible heat conducting member 40.

In the attached state of the spark plug to the sleeve the flexible heat conducting member 40 may hence be compressed between the second contact surface 20 and the region 28, such that the sigmoidal shape may attain a more dense configuration, such that the longitudinal components may be arranged adjacent to each other, thereby providing an improved heat conducting surface or interface.

By the same token, a heat conducting interface is also provided when only a limited movement of the outer shell of the spark plug in the longitudinal direction is possible, e.g. due to low tolerances of the materials, since the flexible heat conducting member 40 acts as a spring force, i.e. a bellows force, such that the heat conducting member 40 extends in a longitudinal direction, and hence contacts both the second contact surface 20 and the region 28. Such limited movement may also be provided by the press-fit engagement of the first contact surface 18 of the outer shell with the distal end 24 of the sleeve.

Hence, by means of the particular configuration of the outer shell, the sleeve, and the flexible heat conducting member 40, it is ensured that both a first heat conducting interface and a second heat conducting interface are provided that are spaced apart from each other in a longitudinal direction. Thereby, an improved cooling of both the distal tip end 14 and pre-chamber body 34, and other components, such as the insulating portion 30, e.g. a ceramic core or layer, is provided.

An alternative embodiment of the flexible heat conducting member 40 is depicted in FIG. 5B as to essentially conical members that may engage each other, when the spark plug is attached to the sleeve. As described in view of the embodiment according to FIG. 5A, the conical members may be ring-shaped, such that both rings engage each other upon attachment of the spark plug, as depicted in FIG. 6B.

Accordingly, the conical members provide a heat conducting interface, when the spark plug is attached to the sleeve. As for the flexible heat conducting member 40 according to FIG. 6A, the conical members are received at opposing ends of the space defined by the second contact surface 20 and the region 28, which are both configured as corresponding steps. The steps hence accommodate the conical members and bias the conical members towards each other upon attachment of the spark plug or outer shell to the sleeve.

The ring-shaped members that may initially be spaced apart from each other are hence brought into engagement with each other, such that a heat conducting interface is provided. Upon compression of the conical members a surface of the interface is enlarged, both in a longitudinal, a perpendicular, and a diagonal direction, such that an optimal heat conductance may be provided upon attachment.

Heat may hence efficiently dissipate from the outer shell to the region 28 of the sleeve via the second contact surface 20 and the flexible heat conducting member 40, such that heat absorbed by e.g. the insulating portion 30 may be removed, thereby reducing the temperature of the insulating portion 30, e.g. the ceramic core.

By the same token, heat may dissipate from the pre-chamber body 34 and the distal tip end 14 to the distal end 24 via the first contact surface 18. Accordingly, the overall temperature of the spark plug may be significantly reduced.

Although FIGS. 6A and 6B depict the second contact surface 20 and the region 28 as matching steps, generally, any shape may be provided to accommodate and/or bias the heat conducting member 40 to provide a heat conducting interface. For example, the heat conducting member 40 may also be provided in the space defined by the second contact surface 20 and the region 28, as depicted in FIGS. 3 and 4.

The efficiency of the improved cooling according to the various embodiments is best shown in the heat maps depicted in FIGS. 7A to 7C. In these heat maps, the temperature ranges from a minimum of 90° C. to a maximum temperature of 579° C. Said temperatures are obtained using boundary conditions, wherein the coolant, e.g. water, provided in the cavity adjacent to the sleeve has a temperature of 90° C. and wherein the combustive mixture or the fire after ignition has a temperature of 700° C.

Accordingly, the embodiment according to FIG. 7A corresponds to the embodiments depicted in FIGS. 1 to 4 and wherein neither a particular configuration of the second surface 20 and the region 28, nor a flexible heat conducting member are provided. Hence, the configuration of the outer shell and the sleeve essentially corresponds to those of reference spark plugs and sleeves, albeit that the distal tip end comprises a first contact surface 18 that is proximate to the distal tip end and which is absent in reference spark plugs.

As indicated by the heat map of FIG. 7A, the provision of the first contact surface 18 proximate to the distal tip end of the spark plug results in a reduction of the temperature of the tip end of the spark plug, e.g. at the pre-chamber body 34, of about 71° C. Therefore, the temperature of the distal tip end of the spark plug may be in a preferred temperature range, indicated by the coloring corresponding to the maximum allowable temperature.

Since the first contact surface 18 is arranged proximate to the distal tip end and the embodiment according to FIG. 7A does not comprise a flexible heat conducting member, the temperature of the insulating portion 30, e.g. the ceramic core of the spark plug, is increased by about 160° C. However, as also indicated by the coloring, this temperature is still acceptable for most insulating materials and hence does not increase the wear of the insulating portion 30. The lack of a heat conducting interface is furthermore shown by the coloring or key of the sleeve, which indicates a significant temperature difference and hence almost no heat dissipation between the second contact surface 20 and the region 28.

In an alternative embodiment corresponding to FIGS. 5A and 6A, a second heat conducting interface is provided by the flexible heat conducting member 40. Accordingly, as indicated in FIG. 7B, heat dissipation is provided from the insulating portion 32. The region 28 via the second contact surface 20 and the flexible heat conducting member 40. Thereby, the temperature of the insulating portion 30 is only increased by about 70° C. in view of arrangements of reference spark plugs and is significantly reduced in view of the embodiment depicted in FIG. 7A.

In addition, since heat may dissipate from the insulating portion 30 and the region of the outer shell at a distance further away from the distal tip end, the accumulation of heat at the distal tip end is reduced, such that the temperature at the distal tip end of the spark plug is also further reduced, i.e. by about 88° C. Hence, the provision of two heat conducting interfaces significantly reduces the temperature of the distal tip end of the spark plug while at the same time providing acceptable and moderate temperatures for the insulating portion 30.

An even further temperature reduction of the spark plug and, in particular, the distal tip end of the spark plug is provided by the embodiment according to FIGS. 5B and 6B, as depicted in the heat map according to FIG. 7C.

The provision of two conical members as a flexible heat conducting member 40 further increases the heat conducting interface, such that heat may dissipate even more efficiently from the insulating portion 30 and the proximal region of the outer shell to the region 28 and adjacent surfaces of the sleeve, since the conical members extend in both a longitudinal direction, a perpendicular direction, and a diagonal direction, thereby increasing the heat conducting surface.

Accordingly, the temperature of the distal tip and of the spark plug, e.g. the pre-chamber body 34, may be reduced by 97° C. while the insulating portion 30 is only increased by about 23° C. While this has a significant effects on the distal tip end of the spark plug in terms of wear, reliability, and operational consistency, this does not significantly increase the temperature of the insulating portion 30, as indicated by the corresponding coloring. Accordingly, the particular configuration of the outer shell, the sleeve, and the flexible heat conducting member 40 provides significant improvements with regard to the thermal load of the spark plug originating from the combustion chamber. However, such significant effect is not limited by the conical shape of the flexible heat conducting member 40, but may likewise be achieved by other shapes as will be apparent to a person skilled in the art in view of the present specification.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A spark plug for an internal combustion engine may be provided. The spark plug may comprise a metal outer shell extending in a longitudinal direction from a proximal end to a distal tip end configured to be oriented towards a combustion chamber. The outer shell comprises a fixation portion for attachment of the spark plug to a metal sleeve of the internal combustion engine and arranged at a region proximal of the tip end. The outer shell may furthermore comprise a first contact surface arranged at a region distal of the fixation portion and configured to contact a distal end of the sleeve, when the spark plug is attached to the sleeve.

It has been found that the thermal loads provided by the operational conditions of a combustion engine, e.g., arising from the combustion chamber, may be unfavorable for both the distal tip end of a spark plug and an insulating portion of the spark plug, e.g., a ceramic layer or core. Accordingly, long time exposure may cause wear and/or may affect the performance of the combustion engine.

Hence, a spark plug may be provided that allows for a more efficient heat transfer or dissipation, such that an improved cooling of the spark plug may be provided. Specifically, this is achieved by a spark plug comprising a first contact surface that is in proximity of a distal tip end of the spark plug and is hence arranged closer to the combustion chamber of the combustion engine. Accordingly, heat may be conducted directly from the distal tip end of the spark plug to a corresponding distal portion of a sleeve of the combustion engine that is in contact with the first contact surface. Since the distal tip end of the spark plug may be in direct communication with the combustion chamber, said tip end has the highest thermal load exposure. The provision of the first contact surface may hence provide an improved cooling thereof.

To facilitate the contact with the distal end of the sleeve, the first contact surface of the spark plug may comprise a shoulder portion, preferably a curved, beveled, truncated, conical, or chamfered portion, configured to engage the distal end of the sleeve, wherein the first contact surface is preferably in press-fit engagement with said distal end, when the spark plug is attached to the sleeve.

Since the metal components of the spark plug and the sleeve of the combustion engine are formed of materials with high stiffness according to the requirements of the combustion engine and furthermore have low tolerances to ensure a correct fitting, the provision of a shoulder portion may ensure that the first contact surface is in contact with the distal end of the sleeve, when the spark plug is attached to the sleeve. In other words, the first contact surface may be formed e.g. as a guiding portion, which may contact the distal end of the sleeve upon initial attachment of the spark plug and may be press-fitted, when the outer shell of the spark plug is fully attached and or fixed to the sleeve. Accordingly, the first contact surface or the distal tip end of the spark plug may be partially resilient, such that the engagement of the first contact surface with the distal end of the sleeve is facilitated.

The term "proximal" and "distal" may be considered to refer to a first end and a second end of the outer shell or spark plug as a whole, e.g. an end arranged at an electrical connection terminal and an end arranged at a combustion chamber, respectively. Furthermore, the longitudinal direction may be considered to refer to a main extending direction of the main body of the outer shell, which may be e.g. essentially cylindrically formed.

The attachment of the outer shell of the spark plug to the sleeve of the combustion engine may be provided as a releasable attachment, wherein the fixation portion preferably comprises a threaded portion configured to engage a corresponding threaded portion on the sleeve.

Accordingly, the outer shell of the spark plug may be screwed into the sleeve by means of the corresponding threads. This provides that a spark plug may be simply replaced by means of a screwing attachment while at the same time a heat conducting surface may be provided distally of the threaded portion, such that improved heat dissipation is provided for the distal tip end. As outlined in the above, the low tolerances and high stiffness of the respective components may limit the movement of the spark plug and the outer shell along a longitudinal axis thereof when screwing the spark plug or outer shell into the sleeve of the combustion engine. In this regard, the provision of a shoulder portion at the distal tip end to e.g. provide a press fit engagement may ensure that a contact is established between the first contact surface of the outer shell and the distal end of the sleeve. Therefore, a heat dissipation at the distal tip end may be ensured, independent of the level of fixation provided by the fixation portion while at the same time a heat conducting surface may be established at a position distal of the fixation portion.

Alternatively, or in addition, the attachment may be provided by a releasable snap-fit arrangement, e.g. by means of a spring member and/or a positive fitting interface. Thereby, a predetermined length of the spark plug may be received by the sleeve, such that a feedback is provided regarding the correct attachment of the spark plug to the sleeve. Such feedback may also be provided when a threaded portion is used as a fixation portion, for example, by means of a predetermined torque to properly attach the outer shell of the spark plug to the sleeve.

To further improve the heat dissipation and thermal conducting properties of the spark plug, the outer shell may furthermore comprise a second contact surface arranged between the first contact surface and the fixation portion, preferably adjacent to the fixation portion, wherein the outer shell may furthermore comprise a flexible heat conducting member arranged to contact the second contact surface and a region of the sleeve proximal of the distal end of the sleeve, when the spark plug is attached to the sleeve.

Positioning a main heat conducting surface in closer proximity to the tip end of the spark plug may increase the thermal load on a main surface or core of the insulating part of the spark plug provided at a further distance from the tip end of the spark. The provision of a second contact surface arranged proximal of the distal tip end and the first contact surface may hence have the advantage that other regions or parts of the spark plug may be provided with an improved heat dissipation, such that it is ensured that the improved cooling of the distal tip end of the spark plug poses no potentially detrimental side effects for other parts of the spark plug.

For example, by means of the second contact surface the heat dissipation of an insulating portion of the spark plug, e.g. a ceramic layer or core, adjacent to the fixation portion may be provided, such that a thermal load on said part caused by the operation conditions of the combustion engine may be reduced. In other words, the cooling of regions of the spark plug that are located at a proximal distance of the distal tip end of the spark plug and that are not sufficiently cooled by means of the distal tip end of the spark plug may be improved by means of the second contact surface.

To ensure that the second contact surface is in contact with the corresponding region of the sleeve the flexible heat conducting member may be provided. As outlined in the above, the high stiffness and low tolerances of the respective components may be required to ensure that the spark plug is correctly attached to the combustion engine to ensure a proper fixation and functioning during operation of the combustion engine. However, this may also provide difficulties when more than one contact surface are provided, such that the engagement of the second contact surface with the corresponding region of the sleeve may be impaired. Accordingly, the provision of a flexible heat conducting member ensures that a contact between the second contact surface of the outer shell and the region of the sleeve is provided.

For example, a flexible heat conducting member may be oriented to extend towards the second surface of the outer shell and the region of the sleeve, wherein a portion of the flexible heat conducting member may deflect and/or deform upon attachment. The flexible heat conducting member may hence be in a press-fitted engagement with the second surface of the outer shell and the region of the sleeve, when the spark plug is attached to the sleeve. The dimensions of the flexible heat conducting member may furthermore be chosen, such that a contact between the second surface of the outer shell and the region of the sleeve is provided upon initial attachment of the spark plug to the sleeve while at the same and when the intended fixation is achieved, including the tolerance levels of the respective components.

The flexible heat conducting member may comprise a ring shape. This facilitates the correct positioning of the flexible heat conducting member around the outer shell of the spark plug while at the same time this may reduce the occurrence of or even prevent the flexible heat conducting member from being disconnected or decoupled from the outer shell of the spark plug. The ring shape may be continuous or discontinuous, e.g. may be circular or semi-circular to enclose a portion of the outer shell, e.g. by means of a positive fitting.

The flexible heat conducting member may furthermore comprise a sigmoidal shape extending in the longitudinal direction of the outer shell, a conical shape, a dome shape, a spherical shape, or semi-spherical shape.

Depending on the dimensions of a space provided between the second surface of the outer shell and the region of the sleeve, the flexible heat conducting member may hence comprise e.g. a sigmoidal or meandering shape, wherein the number of curvatures may be dependent on the dimensions of said space and wherein a space of each curvature may be reduced when attaching the spark plug to the sleeve. The flexible heat conducting elements may accordingly comprise a bellows or spring function, such that a contact between the second surface of the outer shell and the region of the sleeve is provided both in an extended form and in a compressed form of the flexible heat conducting element. Furthermore, the sigmoidal shape ensures that a large contact surface is provided, such that heat dissipation to the sleeve is facilitated via the second surface of the outer shell.

Alternatively, the flexible heat conducting member may comprise a conical shape or dome-shape, which extends in a direction between the second surface of the outer shell and the region of the sleeve and may equally be compressed when the spark plug is attached to the sleeve. For example, the conical shape may extend in a radial direction upon compression, such that a larger surface area is provided that is in contact with the second surface of the outer shell or the region of the sleeve. By the same token, an extension in a radial direction may also be provided when a flexible heat conducting element having a shape of a sphere or a ball shape or semi-spherical shape is chosen, such that an ellipsoid or donut-shape having a larger heat conducting surface area is formed.

Instead of providing a single ring, the flexible heat conducting member may also be formed of two ring shaped members that engage each other, when the spark plug is attached to the sleeve.

The two ring shaped members may hence be formed as matching geometries that contact each other at an interface, wherein the respective geometries may e.g. comprise a concave and convex geometry at said interface.

Alternatively, or in addition, the ring-shaped members may e.g. be formed as conical members, wherein the respective cones are pointed to each other, such that the conical sides may be aligned side-by-side to form said interface. Accordingly, the essentially circular shape of each conical member may be directed towards the second surface of the outer shell and the region of the sleeve, respectively. Upon attachment of the spark plug to the sleeve, the conical members may be compressed, such that the respective cones are truncated and the essentially circular shape of each conical member is extended in a radial direction. Thereby, the heat conducting surface of each conical member is increased, such that an improved heat dissipation is provided.

To facilitate the heat conduction from the second surface of the outer shell to the region of the sleeve, the second surface may furthermore comprise a shoulder portion or step configured to compress the flexible heat conducting member, when the spark plug is attached to the sleeve.

Accordingly, the shoulder portion or step of the second surface may delimit the flexible heat conducting member in a predefined or predetermined manner, such that a desired heat conducting surface may be established upon attachment of the spark plug to the sleeve. The shoulder portion or step hence reduces the space between the second surface and the sleeve while at the same time it may provide a guiding surface to direct or bias the flexible heat conducting member.

Further, the second surface may be formed to accommodate the flexible heat conducting member, wherein the second surface preferably comprises a shape at least partially matching a shape of the flexible heat conducting member.

For example, the flexible heat conducting member may be received by or may be seated on the second surface of the outer shell. Thereby, the heat conducting surface may be further enlarged while at the same time, a correct positioning of the flexible heat conducting member with respect to the second surface may be facilitated.

In addition, a partially matching shape may provide that the flexible heat conducting member is biased or extends in a correct position upon attachment of the spark plug to the sleeve. For example, the flexible heat conducting member may be formed as a two-shaped ring having respective conical members, or in the second surface of the outer shell may be formed to accommodate e.g. a circle portion of the conical member or may be generally formed to accommodate a base or resting portion of each conical number.

By the same token, the second surface may be formed to match a shape of a longitudinal component of a flexible heat conducting member, i.e. a component comprise between two curvatures. Accordingly, a resting surface of the flexible heat conducting element may be received by a corresponding shape of the second contact surface of the outer shell, such that the flexible heat conducting member is delimited and/or biased in a predetermined and intended direction.

By means of the at least partially matching shapes the heat conductance from the spark plug to the sleeve may furthermore be improved due to the enlarged interface between the outer shell and the flexible heat conducting member and/or between the flexible heat conducting member and the region of the sleeve.

The sleeve of the combustion engine may not only facilitate the attachment of the spark plug to the combustion engine, e.g. by means of a screwing fixation with corresponding threaded portions, but also forms a heat conducting surface, such that the heat absorbed by the spark plug, in particular by the outer shell and an insulating portion of the spark plug, may dissipate into the sleeve to provide a cooling of the spark plug. Accordingly, the sleeve of the combustion engine may be formed of a heat conducting material, preferably a metal, such as stainless steel.

Furthermore, the sleeve may form a barrier between the spark plug and a cavity configured to accommodate a coolant of the internal combustion engine.

The heat that is absorbed by the sleeve may hence dissipate into the coolant, e.g. water, of the combustion engine. The first contact surface in proximity of or at the distal tip end of the spark plug or outer shell of the spark plug may hence be arranged such that the distal end of the sleeve that is in engagement with the first contact surface is cooled by the coolant accommodated in the cavity of the internal combustion engine. Thereby, a cooling of the distal tip end of the spark plug may be further improved.

The arrangement of the first contact surface together with a configuration of the sleeve and a cavity of the combustion engine comprising a coolant in combination hence enables that an improved cooling of the distal tip end may be provided. Common spark plugs having a contact surface at a further distance, i.e. more proximal of the distal tip end, are not feasible to provide such synergetic configuration.

The outer shell of the spark plug may furthermore enclose an insulating portion covering a center electrode extending in a longitudinal direction, wherein said insulating portion may furthermore house a fuel injection channel and/or wherein the distal tip end may be configured to accommodate a pre-chamber body.

Accordingly, the spark plug may be configured for internal combustion engines, wherein both the ignition of a combusted mixture and a distribution of the injected fuel are provided by or via the spark plug. For example, the pre-chamber body may be configured as a nozzle comprising one or more openings through which air may penetrate the pre-chamber body and through which fuel may be injected to form droplets or a nebula of said fuel, such that the mixture of air with the fuel is facilitated to provide a combusted mixture.

Furthermore, the fuel injection may optionally be provided by an inner core of the spark plug, e.g., parallel to a center electrode. Accordingly, the spark plug may be configured depending on the requirements of the combustion engine. Hence, a fuel injection may also be separate from the spark plug and a pre-chamber body may also be merely optional. The basic structure of a spark plug is well known to a person skilled in the art, such that other features or more specific configurations of the spark plug are thus not specified in further detail.

Furthermore, a sleeve for an internal combustion engine may be provided. The sleeve may be configured to receive a metal outer shell of a spark plug for an internal combustion engine comprising a distal tip end configured to be oriented towards a combustion chamber, wherein the sleeve may comprise a fixation portion, preferably a threaded portion, configured to engage a corresponding fixation portion of the outer shell. Furthermore, the sleeve may comprise a distal end configured to contact a first contact surface of the outer shell arranged at a region distal of the fixation portion, when the spark plug is attached to the sleeve.

The sleeve may form an integral part of the combustion engine and/or may be fixed to a body or mass of the combustion engine by means of e.g. a threaded portion, such that the sleeve may be screwed into the combustion engine, for example, into a bore providing a communication to the combustion chamber of the engine. The sleeve facilitates the attachment of the spark plug to the combustion engine, e.g. by means of a screwing fixation with corresponding threaded portions, such that a spark plug may be releasably attached. The sleeve may hence extend in a longitudinal direction exceeding a length of the outer shell of the spark plug, such that said spark plug may be fully received within the sleeve.

Furthermore, the sleeve forms a heat conducting surface, such that the heat absorbed by the spark plug, in particular by the outer shell and an insulating portion of the spark plug, may dissipate into the sleeve to provide a cooling of the spark plug. Accordingly, the sleeve of the combustion engine may be formed of a heat conducting material, preferably a metal, such as stainless steel.

Further, the sleeve may form a barrier between the spark plug and a cavity configured to accommodate a coolant of the internal combustion engine.

The heat that is absorbed by the sleeve may hence dissipate into the coolant, e.g. water, of the combustion engine. The first contact surface in proximity of or at the distal tip end of the spark plug or outer shell of the spark plug may hence be arranged such that the distal end of the sleeve that is in engagement with the first contact surface is cooled by the coolant accommodated in the cavity of the internal combustion engine. Thereby, a cooling of the distal tip end of the spark plug may be further improved.

The sleeve may additionally comprise a region proximal of the distal end of the sleeve and configured to contact a flexible heat conducting member of the spark plug, wherein the flexible heat conducting member is arranged to contact a second contact surface of the spark plug arranged between the first contact surface and the fixation portion of said spark plug, when the spark plug is attached to the sleeve.

The provision of the region of the sleeve to contact a second contact surface of the spark plug facilitates the heat dissipation of the spark plug at a further distance from the distal tip end, such that the cooling of these portions may also be improved. Accordingly, heat absorbed by an insulation portion or ceramic layer arranged proximally of the first contact surface is not required to dissipate via the first contact surface, but instead may be dissipated via the second contact surface to the region of the sleeve via the flexible heat conducting member. Accordingly, the thermal load may be reduced, such that temperatures potentially damaging the ceramic layer may be avoided.

Further, the region of the sleeve may comprise a shoulder or step configured to accommodate the flexible heat conducting member of the spark plug, wherein preferably the shoulder or step is configured to compress the flexible heat conducting member of the spark plug, when the spark plug is attached to the sleeve.

For example, a shoulder or step may be formed to retain a portion of the flexible heat conducting member, such that the flexible heat conducting member is deformed or biased into a predetermined direction upon attachment of the spark plug, e.g. by a compression. Furthermore, the shoulder or step may ensure that such deformation occurs, independent of the fixation strength of the spark plug and the corresponding tolerances. Thereby, a consistency of a heat conducting performance between various spark plugs and sleeves may be increased.

INDUSTRIAL APPLICABILITY

With reference to the Figures and in operation, a spark plug 1 for an internal combustion engine is suggested. The spark plug 1 comprises a metal outer shell 10 extending in a longitudinal direction A from a proximal end 12 to a distal tip end 14 configured to be oriented towards a combustion chamber 34. The outer shell comprises a fixation portion 16 for attachment of the spark plug 1 to a metal sleeve 22 of the internal combustion engine and arranged at a region proximal of the tip end 14, wherein the outer shell 10 furthermore comprises a first contact surface 18 arranged at a region distal of the fixation portion 16 and configured to contact a distal end 24 of the sleeve 22, when the spark plug 1 is attached to the sleeve 22.

The spark plug 1 as mentioned above is applicable in internal combustion engines and may particularly replace existing spark plugs by means of the fixation portion 16 as a replacement or retrofit part. Accordingly, the spark plug 1 may provide an ignition system for combustion engines. Furthermore, the provision of the first contact surface 18 provides an improved cooling function compared with conventional spark plugs.

The invention claimed is:
1. A spark plug for an internal combustion engine, comprising a metal outer shell extending in a longitudinal direction from a proximal end configured to receive an electrical connection terminal to a distal tip end configured to be oriented towards a combustion chamber, said outer shell comprising:

a fixation portion for attachment of the spark plug to a metal sleeve of the internal combustion engine, the fixation portion positioned adjacent the proximal end of the outer shell the metal sleeve having, a distal end proximate the distal tip end of the outer shell, a first contact surface arranged proximate the distal tip end of the outer shell and configured to contact the distal end of the metal sleeve when the spark plug is attached to the sleeve, and a second contact surface arranged between the fixation portion and the first contact surface and configured to contact a region of the metal sleeve when the spark plug is attached to the sleeve.

2. The spark plug according to claim 1, wherein the first contact surface comprises a shoulder portion, preferably a curved, beveled, truncated, conical, or chamfered portion, configured to engage the distal end of the sleeve, wherein the first contact surface is preferably in press-fit engagement with said distal end, when the spark plug is attached to the sleeve.

3. The spark plug according to claim 1, wherein the attachment is a releasable attachment, Wherein the fixation portion preferably comprises a threaded portion configured to engage a corresponding threaded portion on the sleeve.

4. The spark plug according to claim 1, wherein the second contact surface is arranged adjacent to the fixation portion, the outer shell furthermore comprising a flexible heat conducting member arranged to contact the second contact surface and a region of the sleeve proximal of the distal end of the sleeve, when the spark plug is attached to the sleeve.

5. The spark plug according to claim 4, wherein the flexible heat conducting member comprises a ring shape.

6. The spark plug according claim 5, wherein the flexible heat conducting member comprises a sigmoidal shape extending in the longitudinal direction of the outer shell, a conical shape, a dome shape, a spherical shape, or semispherical shape.

7. The spark plug according to claim 6, wherein the flexible heat conducting member is formed of two ring shaped members that engage each other, when the spark plug is attached to the sleeve.

8. The spark plug according to claim 4, wherein the second surface comprises a shoulder portion or step configured to compress the flexible heat conducting member, when the spark plug is attached to the sleeve.

9. The spark plug according to claim 8, wherein the second surface is formed to accommodate the flexible heat conducting member, wherein the second surface preferably comprises a shape at least partially matching a shape of the flexible heat conducting member.

10. The spark plug according to claim 1, wherein the sleeve forms a barrier between the spark plug and a cavity configured to accommodate a coolant of the internal combustion engine.

11. The spark plug according to claim 1, wherein the outer shell encloses an insulating portion covering a center electrode extending in a longitudinal direction, said insulating portion furthermore housing a fuel injection channel, wherein the distal tip end is configured to accommodate a pre-chamber body.

12. A sleeve for an internal combustion engine, said sleeve being configured to receive a metal outer shell of a spark plug comprising a distal tip end configured to be oriented towards a combustion chamber and a proximal end configured to receive an electrical connection terminal, said sleeve comprising;

a threaded fixation portion configured to engage a corresponding fixation portion of the Outer shell, the corresponding fixation portion of the outer shell being positioned adjacent the proximal end of the outer shell;

a distal end proximate the distal tip end of the outer shell and configured to contact a first contact surface of the outer shell when the spark plug is attached to the sleeve; and a region positioned proximate the threaded fixation portion and configured to contact a second contact surface of the outer shell when the spark plug is attached to the sleeve.

13. The sleeve according to claim 12, said region configured to contact a flexible heat conducting member of the spark plug arranged between the first contact surface and the fixation portion of said spark plug, when the spark plug is attached to the sleeve.

14. The sleeve according to claim 13, wherein the region comprises a shoulder or step configured to accommodate the flexible heat conducting member of the spark plug, wherein preferably the shoulder or step is configured to compress the flexible heat conducting member of the spark plug, when the spark plug is attached to the sleeve.

15. The sleeve according to claim 14, wherein the sleeve forms a barrier between for a cavity configured to accommodate a coolant of the internal combustion engine.

* * * * *